(12) United States Patent
Wang et al.

(10) Patent No.: US 12,105,562 B2
(45) Date of Patent: *Oct. 1, 2024

(54) PORTABLE ELECTRONIC DEVICE WITH AT LEAST ONE EXTERNAL DISPLAY

(71) Applicant: Acer Incorporated, New Taipei (TW)

(72) Inventors: Yu-Shih Wang, New Taipei (TW);
Yi-Ta Huang, New Taipei (TW);
Chih-Chun Liu, New Taipei (TW);
Cheng-Nan Ling, New Taipei (TW);
Wen-Chieh Tai, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,784

(22) Filed: May 23, 2023

(65) Prior Publication Data

US 2023/0297142 A1    Sep. 21, 2023

Related U.S. Application Data

(63) Continuation of application No. 17/686,441, filed on Mar. 4, 2022, now Pat. No. 11,703,914.

(30) Foreign Application Priority Data

Apr. 21, 2021    (TW) .................................. 110114347

(51) Int. Cl.
*G06F 1/16*    (2006.01)

(52) U.S. Cl.
CPC .......... *G06F 1/1654* (2013.01); *G06F 1/1607* (2013.01); *G06F 1/1647* (2013.01)

(58) Field of Classification Search
CPC .... G06F 1/1647; G06F 1/1654; G06F 1/1607; G09F 9/302; G09F 9/3023; G09F 9/3026
See application file for complete search history.

(56) References Cited

U.S. PATENT DOCUMENTS

| 8,625,273 B2* | 1/2014 | Zhou ...................... F16M 11/10 |
| --- | --- | --- |
| | | 361/679.41 |
| 11,703,914 B2* | 7/2023 | Wang .................... G06F 1/1616 |
| | | 361/679.29 |

* cited by examiner

*Primary Examiner* — James Wu
(74) *Attorney, Agent, or Firm* — JCIPRNET

(57) ABSTRACT

A portable electronic device including a main display having a locking recess at a side edge and at least one external display detachable relative to the side edge of the main display is provided. The external display includes a body, and at least one latch pivoted to the body. The latch is pivoted to the body to be swiveled out of or into the body. An opening of the locking recess faces obliquely upward and faces away from a direction of gravity when the main display is standing, the at least one latch swiveled out of the body faces obliquely downward and faces forward the direction of gravity to be inserted into the locking recess, and the at least one external display is hung on at the side edge of the main display by a weight of the at least one external display.

10 Claims, 4 Drawing Sheets

PORTABLE ELECTRONIC DEVICE WITH AT LEAST ONE EXTERNAL DISPLAY

CROSS-REFERENCE TO RELATED APPLICATION

This is a continuation application of and claims the priority benefit of U.S. application Ser. No. 17/686,441, filed on Mar. 4, 2022, which claims the priority benefit of Taiwan application serial no. 110114347, filed on Apr. 21, 2021. The entirety of each of the above-mentioned patent applications is hereby incorporated by reference herein and made a part of this specification.

BACKGROUND

Technical Field

The disclosure relates to a portable electronic device, and more particularly, to a portable electronic device with at least one external display.

Description of Related Art

Subject to the use conditions of being thin and portable, the size of the display of the general notebook computer is limited, and it may not provide a comfortable display environment like a desktop computer. Therefore, notebook computers often meet the demand of extending or expanding the display screens by using display ports that can be connected to external displays.

However, generally speaking, these external displays are still independent from the displays of the notebook computers. Therefore, for users, the display screen they are viewing would be divided and unextended.

SUMMARY

The disclosure provides a portable electronic device with at least one external display, and the at least one external display may be assembled beside or detached from a main display of the portable electronic device by a simple movable latch, so that a display screen of the portable electronic device has continuity and extensibility.

A portable electronic device with at least one external display according to the disclosure includes a main display and at least one external display. The external display is detachable relative to one side of the main display. The external display includes a body, a slider, at least one latch, and at least one elastic member. The slider is slidably disposed in the body. The latch is pivoted to the body, and the latch has a driving column and a tenon portion opposite to each other. The driving column is movably connected to the slider, such that when the slider slides relative to the body, the latch is driven to pivot relative to the body, and the tenon portion is rotated out of the body or hidden in the body. The elastic member is connected between the slider and the body. The tenon portion that is rotated out of the body is inserted into the main display, so that the external display is combined to the main display.

Based on the above, the external display of the portable electronic device is equipped with the movable latch, and the slider may drive the tenon portion of the latch to be rotated out of the body or hidden in the body while being driven, such that when the tenon portion is rotated out of the body, the external display may be inserted into the side of the main display by the latch, and the external display and the main display may be combined with each other. In this way, the at least one external display of the portable electronic device may be disposed on a periphery of the main display, thereby extending and expanding the display screen of the portable electronic device.

DETAILED DESCRIPTION OF DISCLOSED EMBODIMENTS

Figure 1:
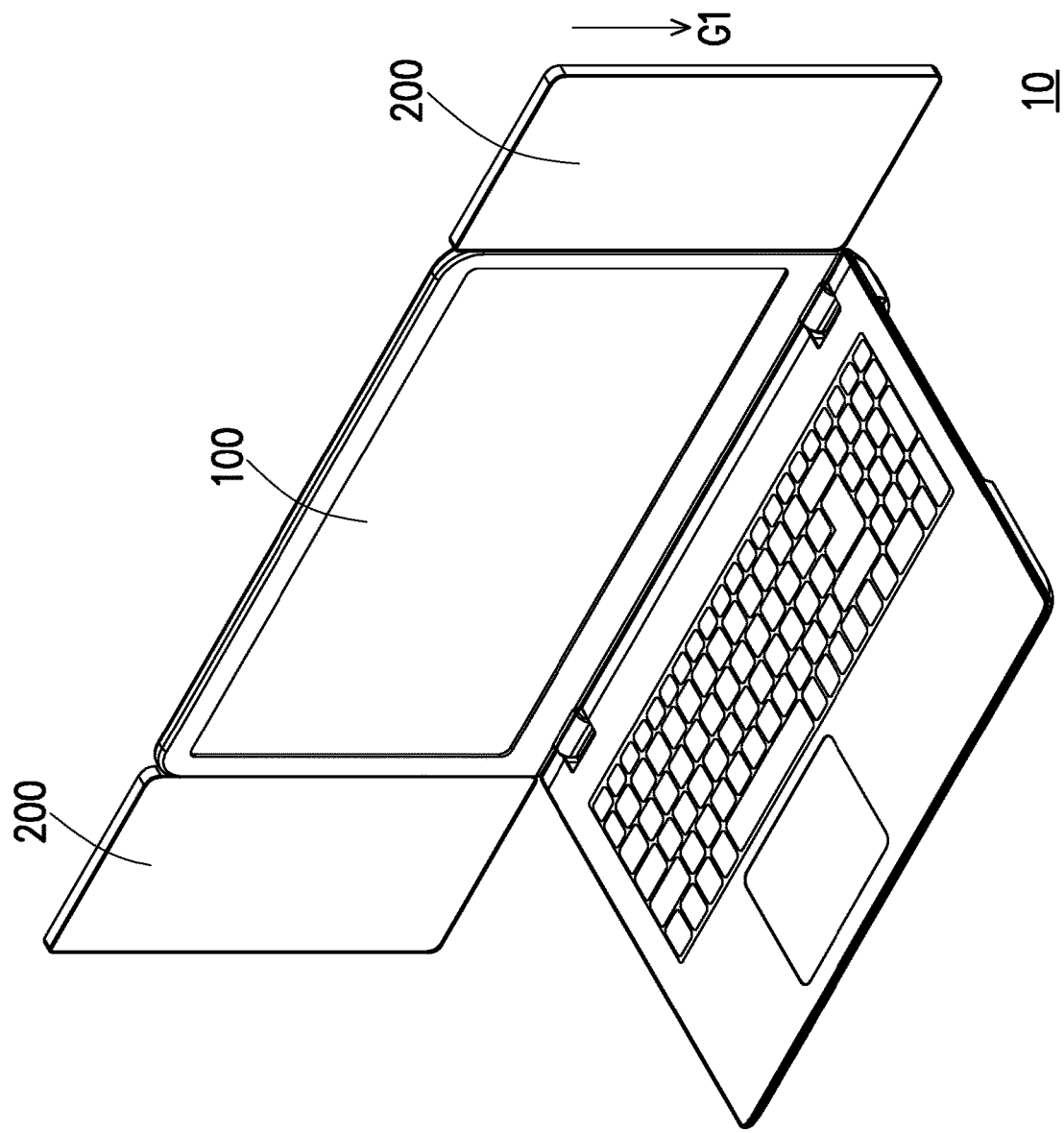
FIG. 1 is a schematic view of a portable electronic device according to the disclosure.
Figure 2:
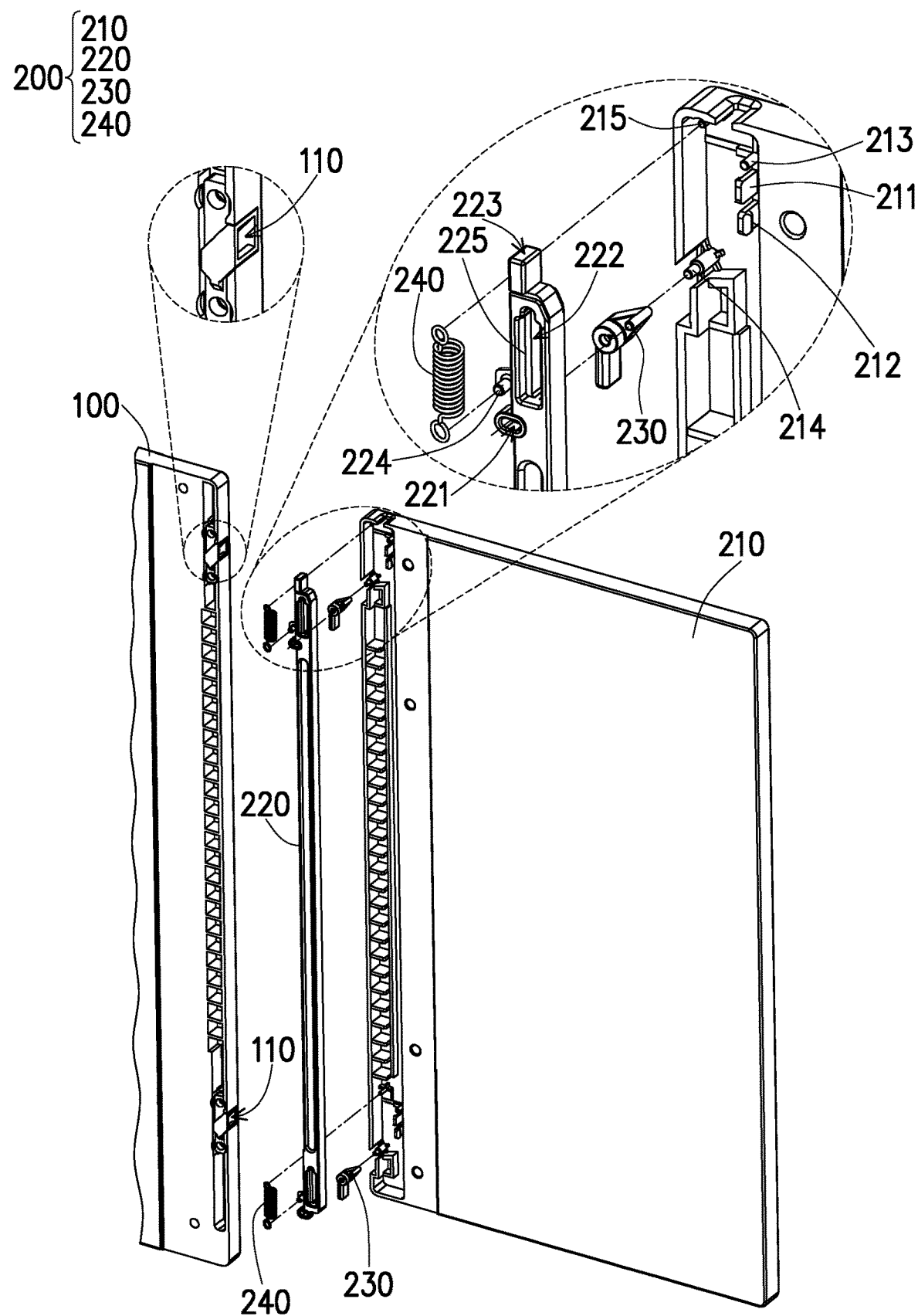
FIG. 2 is a partial exploded view of the portable electronic device of FIG. 1.

FIG. 1 is a schematic view of a portable electronic device according to the disclosure. FIG. 2 is a partial exploded view of the portable electronic device of FIG. 1. Referring to both FIGS. 1 and 2, in this embodiment, a portable electronic device 10, such as a notebook computer, includes a main display 100 and at least one external display 200 (two external displays 200 are shown here as an example). The external display 200 is detachable relative to one side of the main display 100. The external display 200 includes a body 210, a slider 220, a latch 230, and an elastic member 240. The slider 220 is slidably disposed in the body 210. The latch 230 is pivoted to a column 214 of the body 210 and coupled to the slider 220, and the elastic member 240 is connected between the slider 220 and the body 210. After the external displays 200 being assembled to the side edge of the main display 100, the display surfaces of the external displays 200 are substantially coplanar with the display surface of the main display 100 to be extending displays of the main display 100.

Figure 3:
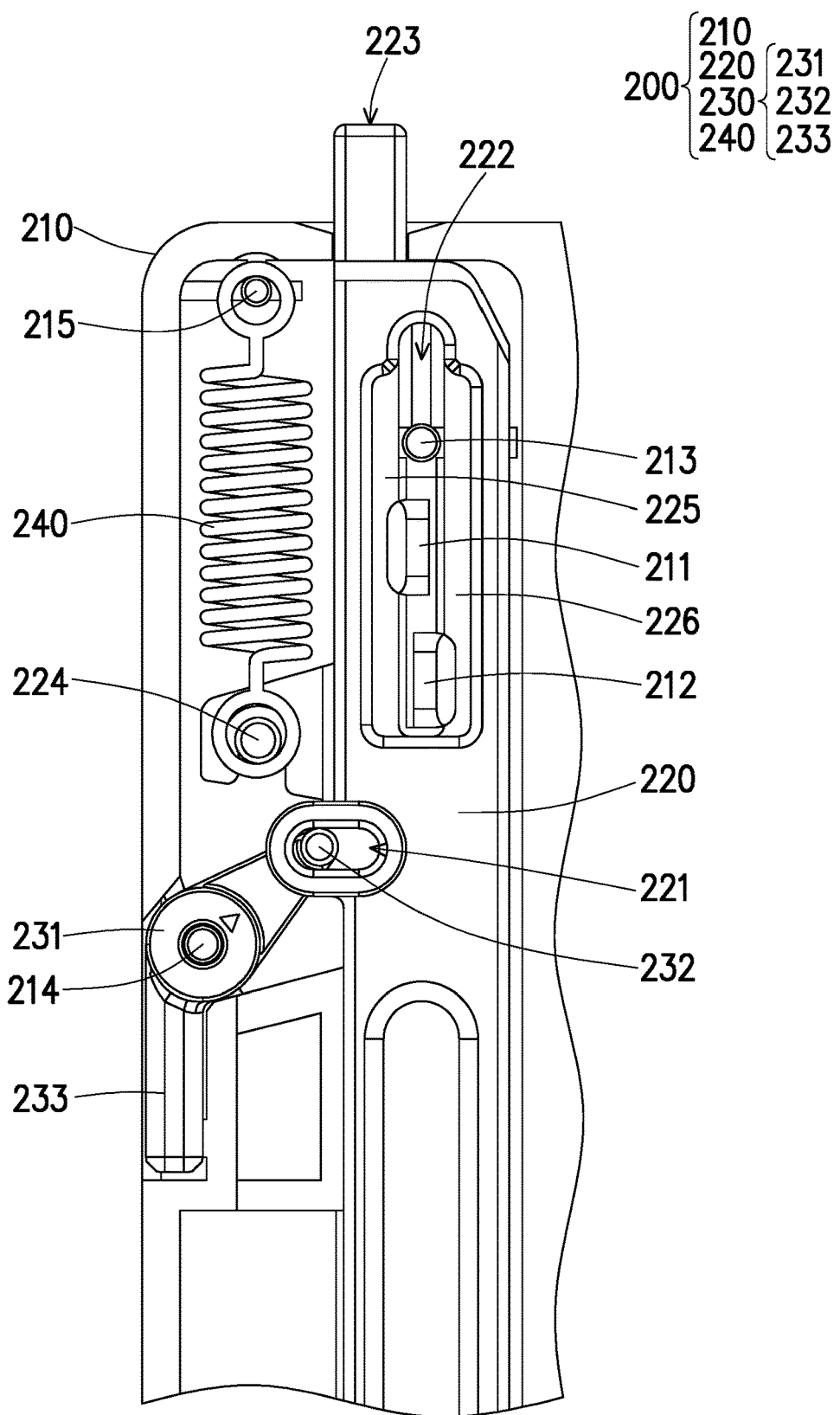
FIGS. 3 and 4 are schematic views of assembling a main display and an external display.
Figure 4:
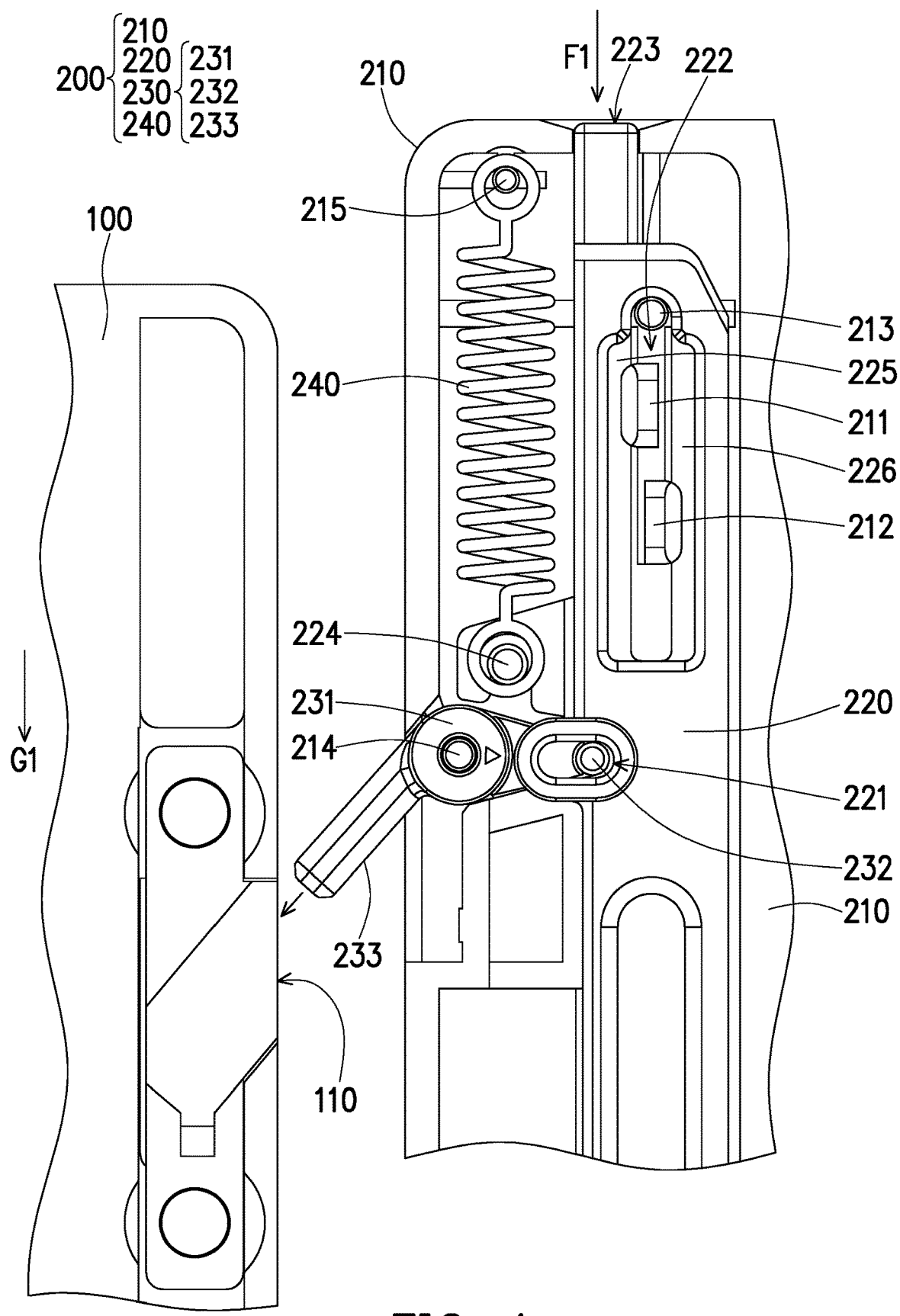

FIGS. 3 and 4 are schematic views of assembling a main display and an external display. Referring to FIGS. 2 and 3 first, in this embodiment, the latch 230 includes a pivot portion 231, and a driving column 232 and a tenon portion 233 opposite to each other. The driving column 232 and the tenon portion 233 substantially extend from two opposite sides of the pivot portion 231. The driving column 232 is movably connected to the slider 220, and in particular, is movably coupled to a guiding hole 221 of the slider 220. One end of the elastic member 240 is connected to a boss 215 of the body 210, and the other end of the elastic member 240 is connected to a boss 224 of the slider 220. Furthermore, the slider 220 further has a guiding recess 222, which is formed by a pair of guiding walls 225 and 226, and the body 210 further has a boss 213. The boss 213 passes through the guiding recess 222, so that when the slider 220 slides, the boss 213 may slide along the pair of guiding walls 225 and 226 (and the formed guiding recess 222) to have a guiding effect.

Furthermore, the body 210 further has a pair of hooks 211 and 212 respectively passing through the guiding recess 222, that is, located between the pair of guiding walls 225 and 226. More importantly, the pair of hooks 211 and 212 are slidably locked on the guiding walls 225 and 226 facing away from each other. As shown in FIGS. 3 and 4, the hook 211 faces toward the left in the figure and is slidably locked on the guiding wall 225, and the hook 212 faces toward the right in the figure and is slidably locked on the guiding wall 226. Accordingly, a corresponding relationship between the hooks 211 and 212, and the guiding walls 225 and 226 may not only generate the guiding effect on the sliding of the slider 220 relative to the body 210, but also provide an effect of limiting the slider 220 in a direction of injecting into or ejecting the plane of the drawing paper because the hooks 211 and 212 are locked on the guiding walls 225 and 226. Accordingly, a corresponding relationship between the hooks 211 and 212, and the guiding walls 225 and 226 may not only generate the guiding effect on the sliding of the slider 220 relative to the body 210, but also provide an effect of limiting the slider 220 in a direction of injecting into or ejecting the plane of the drawing paper because the hooks 211 and 212 are locked on the guiding walls 225 and 226. That is, it is ensured that the slider 220 may be stably attached to an inner surface of the body 210 to move without falling off the body 210, so as to improve a stabilizing effect of a sliding stroke of the slider 220.

Referring to both FIGS. 3 and 4, the slider 220 of this embodiment further has a pressing portion 223, and the pressing portion 223 protrudes out of the body 210 (as shown in FIG. 3) as the slider 220 slides relative to the body 210, or is hidden in the body 210 (as shown in FIG. 4). A user is adapted for providing a force F1 to press the pressing portion 223 and push the slider 220 accordingly. At the same time, the driving column 232 is movably coupled to the guiding hole 221, and the slider 220 substantially slides in a vertical direction, while the guiding hole 221 expands in a horizontal direction. Therefore, a linear movement of the slider 220 may drive the latch 230 to rotate relative to the body 210 accordingly, so that the tenon portion 233 is rotated out of the body 210 or hidden in the body 210. Referring to both FIGS. 2 and 4, the tenon portion 233 that is rotated out of the body 210 may be used to be inserted into and locked in a locking recess 110 on the side of the main display 100. Here, the tenon portion 233 may be locked in the locking recess 110 by a tight-fitting structure.

Referring to FIG. 4 and comparing with FIG. 1, in this embodiment, the tenon portion 233 that is rotated out of the body 210 is adapted for being inserted into in a forward direction of a direction of gravity G1 and engaged with the locking recess 110 of the main display 100, so that the external display 200 is hung beside the main display 100 by its own weight. The forward direction refers to that an included angle between the tenon portion 233 and the direction of gravity G1 is less than 90 degrees, which is beneficial for the user to hang the external display 200 beside the main display 100 while providing the force F1 to press the pressing portion 223 of the slider 220. Here, the slider 220 may be regarded as moving along the direction of gravity G1 to rotate the tenon portion 233 out, while the elastic member 240 also deforms and accumulates an elastic force due to the relative sliding of the slider 220. When the tenon portion 233 that is rotated out of the body 210 is inserted into the main display 100 to complete the combination by the gravity (the weight of the external display 200), it also means that the tenon portion 233 that is rotated out of the body 210 is required to maintain the state of being rotated out as shown in FIG. 4. Conversely, when the user detaches the external display 200 from the main display 100, and no longer provides the force F1, the elastic force of the elastic member 240 may drive the slider 220 to reset, and the pressing portion 223 may protrude out of the body 210 again.

It should be further mentioned that, as shown in FIG. 1, the two external displays 200 are each combined to the main display 100 by the same latching mechanism. However, this embodiment is not limited to the number of the external displays 200 and the positions where the external displays 200 are combined to the main display 100. In addition, as shown in FIG. 2, a top and a bottom of the slider 220 each have the corresponding latch 230 and the corresponding elastic member 240. Since the structure and the operation mode of the corresponding latch 230 and the corresponding elastic member 240 are the same, the above description is made only with the components at the top. The balance of the components in this embodiment is further considered, and this embodiment is set as shown in FIG. 2. In another unillustrated embodiment, the slider 220 may be configured with only one corresponding latch 230 and one corresponding elastic member 240, and the operation mode remains the same as described above without changing.

Based on the above, in the embodiment of the disclosure, the external display of the portable electronic device is equipped with a movable latch, and the slider may drive the tenon portion of the latch to be rotated out of the body or hidden into the body while being driven, such that when the tenon portion is rotated out of the body, the external display may be inserted into the side of the main display by the latch, and the external display and the main display may be combined with each other. In this way, the at least one external display of the portable electronic device may be disposed on a periphery of the main display, thereby extending and expanding a display screen of the portable electronic device.

What is claimed is:

1. A portable electronic device with at least one external display, comprising:
    a main display having a locking recess at a side edge; and
    the at least one external display detachable relative to the side edge of the main display, wherein the at least one external display comprises:
        a body; and
        at least one latch pivoted to the body to be swiveled out of or into the body,
    wherein an opening of the locking recess faces obliquely upward and faces away from a direction of gravity when the main display is standing, the at least one latch swiveled out of the body faces obliquely downward and faces forward the direction of gravity to be inserted into the locking recess, and the at least one external display is hung on at the side edge of the main display by a weight of the at least one external display.

2. The portable electronic device with the at least one external display according to claim 1, wherein the at least one external display further comprises:
    a slider slidably disposed in the body,
    wherein the at least one latch has a driving column and a tenon portion opposite to each other, the driving column is movably connected to the slider, such that the slider slides relative to the body, the latch is driven to pivot relative to the body, and the tenon portion is rotated to be swiveled out of or into the body,
    wherein the at least one external display is combined to the main display by the tenon portion swiveling out of the body, inserting into and engaging with the locking recess.

3. The portable electronic device with the at least one external display according to claim 2, wherein the at least one external display further comprises:
    at least one elastic member, connected between the slider and the body,
    wherein the slider has a pressing portion, the pressing portion protrudes out of the body or is hidden in the body as the slider slides relative to the body, and a user is adapted for pressing the pressing portion to push the slider, rotate the tenon portion out, and deform the at least one elastic member.

4. The portable electronic device with the at least one external display according to claim 2, wherein the at least one latch has a pivot portion pivoting to the body, and the driving column and the tenon portion extending from two opposite sides of the pivot portion, and the driving column is movably coupled to a guiding hole of the slider.

5. The portable electronic device with the at least one external display according to claim 4, wherein the guiding hole expands in a horizontal direction, and the slider slides in a vertical direction.

6. The portable electronic device with the at least one external display according to claim 2, wherein the slider has a guiding recess, the body has a boss, and the boss passes through the guiding recess and moves along the guiding recess.

7. The portable electronic device with the at least one external display according to claim 6, wherein the slider has a pair of guiding walls forming the guiding recess, and the body further has a pair of hooks respectively passing through the guiding recess and slidably locked on the pair of guiding walls.

8. The portable electronic device with the at least one external display according to claim 7, wherein the pair of hooks face away from each other.

9. The portable electronic device with the at least one external display according to claim 2, wherein the slider slides along the direction of gravity.

10. The portable electronic device with the at least one external display according to claim 2, wherein the tenon portion is inserted into the locking recess in a forward direction of gravity, and the forward direction of gravity is that an included angle of the tenon portion relative to the direction of gravity is less than 90 degrees.

* * * * *